(No Model.)
J. McALLISTER.
TIRE TIGHTENER.
No. 416,039. Patented Nov. 26, 1889.
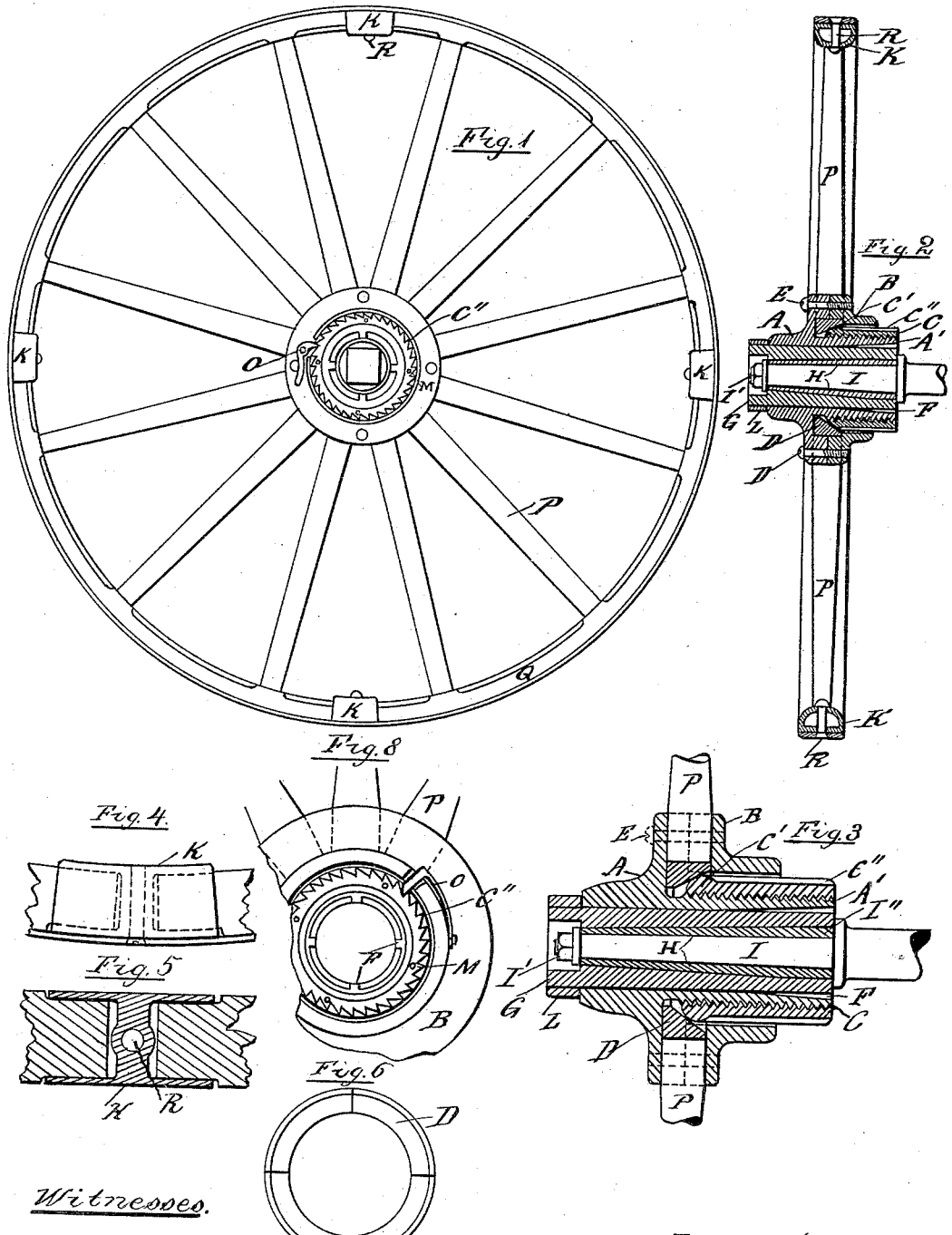
Witnesses.
Archibald McLean
Bernhard G. Lingeman
Inventor.
John McAllister
per Geo. R. Ferguson,
Attorney.

UNITED STATES PATENT OFFICE.

JOHN McALLISTER, OF BROOKLYN, NEW YORK, ASSIGNOR OF ONE-HALF TO ANDREW J. McALLISTER, OF SAME PLACE.

TIRE-TIGHTENER.

SPECIFICATION forming part of Letters Patent No. 416,039, dated November 26, 1889.

Application filed August 22, 1889. Serial No. 321,647. (No model.)

*To all whom it may concern:*

Be it known that I, JOHN McALLISTER, a citizen of the United States, residing at Brooklyn, in the county of Kings, State of New York, have invented a new and useful Improvement in Tire-Tighteners, of which the following is a specification.

My improvement relates to means for securing the tires of wheels to the fellies without rendering heating and shrinking of the tire necessary to keep the tire tight when once put on, and to enable the tire to be readily put in place or removed for repairs. I attain these objects by means of the mechanism illustrated in the accompanying drawings, in which—

Figure 1 is an elevation of the wheel; Fig. 2, a vertical section through the center of the wheel; Fig. 3, an enlarged detail of the hub; Fig. 4, an elevation, and Fig. 5 a plan view, on an enlarged scale, of the clips used in securing the sections of the fellies; Fig. 6, a plan, and Fig. 7 a central section, of one of the parts employed, and Fig. 8 an end elevation of the hub.

Similar letters refer to similar parts throughout the several views.

The hub is formed by bolting together the two rings A B by means of bolts E. When it is desirable to use an ordinary axle and box, the hub is provided with a wooden core G, that is forced into the prolonged part of ring A, prevented from turning therein by means of the splines F, cast with A, and the core G is secured by the band L on its outer end. The conical spindle or axle I of the shaft rests in a bushing or journal-box H, made conical and forced into the wooden core G. The end of the spindle is provided with a washer and nut I'. The ring-sleeve A is prolonged to A', and is here provided with an external screw-thread, upon which is fitted a screw-sleeve C, provided with a rounded end at C'. This rounded end C' presses against a conical ring D, made in two or more pieces preferably four; and on the exterior surface of the ring C are provided ratchet-teeth C'', into which the pawl O fits. The pawl O is pivoted to the piece B, or may preferably be a spring-pawl, as shown in Fig. 8. The spokes P are fitted between the two rings A B, and at the outer end are secured in any desirable manner to the fellies Q. The fellies Q are made in sections and fit at the ends into clips K, the ends being reduced to permit a certain amount of separation of the parts. The sleeve C is provided with two or more holes M, into which a spanner-wrench may be fitted.

The manner of operating my device is as follows: The spokes, fellies, and clips having been assembled, the spokes are then placed in position between the rings A and B, which are then bolted together by the bolts E. The sleeve C is loosely screwed on, permitting the conical ring D to close. The tire is placed around the fellies, and the sleeve C is then screwed in, the rounded end of which spreads apart the divided conical ring D, and this in turn forces out the spokes and fellies against the tire, thus firmly binding them together, and the ratchet and pawl holding them secured. The clips are then secured to the tire by bolts or rivets. To remove the tire, the pawl O is first sprung out of the teeth of the screw-sleeve C, which is then slackened out, the tire becomes loose and may be removed by taking out the bolts or rivets R, securing the clips.

It is evident that the hub need not be provided with the wooden core G, and that the end of the axle I may be let directly into a conical bearing formed by reaming out the ring A and its prolongation A' without interfering with the nature of my invention.

Having thus described my invention, what I claim as new, and desire to secure by Letters Patent, is—

In a wheel, the combination of a hub-ring A, provided with the threaded extension A', the adjustable sleeve C thereon provided with an exterior of ratchet-teeth, a hub-ring B, provided with a pawl O, fitting said ratchet-teeth, and a sectional conical ring D, the hub-rings A and B being rigidly secured together, substantially as described.

JOHN McALLISTER.

Witnesses:
MICHAEL DILLMEIER,
EDWARD DILLMEIER.